US008737812B2

(12) United States Patent
Odaka et al.

(10) Patent No.: US 8,737,812 B2
(45) Date of Patent: May 27, 2014

(54) CONTENT PLAYBACK APPARATUS AND CONTENT PLAYBACK METHOD

(75) Inventors: Kenji Odaka, Fuchu (JP); Satoshi Ozaki, Hamura (JP); Naoki Esaka, Tachikawa (JP); Shirou Wakayama, Ome (JP); Kensaku Fujimoto, Ome (JP); Yosuke Takahashi, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 144 days.

(21) Appl. No.: 13/283,303

(22) Filed: Oct. 27, 2011

(65) Prior Publication Data
US 2012/0219270 A1 Aug. 30, 2012

(30) Foreign Application Priority Data
Feb. 28, 2011 (JP) .................................. 2011-042624

(51) Int. Cl.
H04N 9/80 (2006.01)
(52) U.S. Cl.
USPC .......................................... 386/248; 386/241
(58) Field of Classification Search
USPC ..................................... 386/263, E09.05, 248
See application file for complete search history.

(56) References Cited

U.S. PATENT DOCUMENTS

| 5,732,067 | A | * | 3/1998 | Aotake ....................... 369/275.3 |
| 6,470,356 | B1 | | 10/2002 | Suzuki |
| 2008/0118232 | A1 | | 5/2008 | Kakumu et al. |
| 2012/0260170 | A1 | * | 10/2012 | Bhogal et al. ................. 715/716 |

FOREIGN PATENT DOCUMENTS

| JP | 2000-099524 | | 4/2000 |
| JP | 2002-049614 | | 2/2002 |
| JP | 2003-150597 | | 5/2003 |
| JP | 2006-060450 | | 3/2006 |
| JP | 2008-154126 | | 7/2008 |
| JP | 2008-252817 | | 10/2008 |
| JP | 2008252817 | A * | 10/2008 |
| JP | 2009-229859 | | 10/2009 |

* cited by examiner

*Primary Examiner* — Thai Tran
*Assistant Examiner* — Girumsew Wendmagegn
(74) *Attorney, Agent, or Firm* — Blakely, Sokoloff, Taylor & Zafman LLP

(57) ABSTRACT

According to one embodiment, a content playback apparatus includes a playback module, a decision module, and a management module. The playback module is configured to play back a content includes components selected from moving picture data, image data, sound data and text data, thereby to produce video data and audio data. The decision module is configured to determine, based on a state of the content playback apparatus, whether the components of the content can be viewed and listened to. The management module is configured to manage video-audio management data includes data items based on a decision result of the decision module, each data item representing whether a video or audio data item has been viewed or listened to.

11 Claims, 4 Drawing Sheets

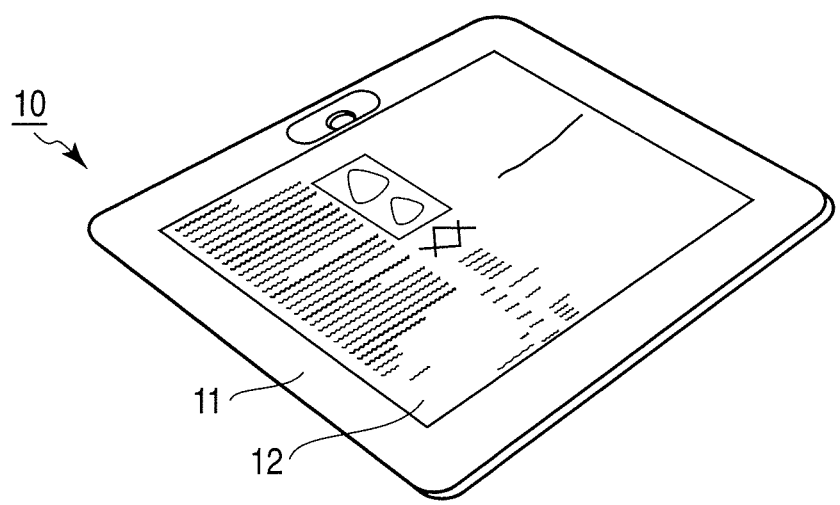
F I G. 1

CONTENT PLAYBACK APPARATUS AND CONTENT PLAYBACK METHOD

CROSS-REFERENCE TO RELATED APPLICATIONS

This application is based upon and claims the benefit of priority from prior Japanese Patent Application No. 2011-042624, filed Feb. 28, 2011, the entire contents of which are incorporated herein by reference.

FIELD

Embodiments described herein relate generally to a content playback apparatus and a content playback method, both designed to play back a content composed of a plurality of components selected from moving picture data, image data, audio data and text data.

BACKGROUND

A playback apparatus has been proposed, which is designed to playback a content that is composed of a plurality of components selected from moving picture data, image data, audio data and text data. If provided as a portable apparatus, the playback apparatus can playback contents in various environments. In some environments, however, the user cannot enjoy listening to any audio content or viewing any video content.

Although the user wants to manage the read/unread state of each component of the content, he or she cannot listen to any sound included in the content or view an image included in the content, depending on the environment in which the apparatus is used. It is inevitably difficult to manage the read/unread state of each component.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a perspective view showing an exemplary content playback apparatus according to an embodiment.

DETAILED DESCRIPTION

Various embodiments will be described hereinafter with reference to the accompanying drawings.

In general, according to one embodiment, a content playback apparatus comprises a playback module, a decision module, and a management module. The playback module is configured to play back a content comprising components selected from moving picture data, image data, sound data and text data, thereby to produce video data and audio data. The decision module is configured to determine, based on a state of the content playback apparatus, whether the components of the content can be viewed and listened to. The management module is configured to manage video-audio management data comprising data items based on a decision result of the decision module, each data item representing whether a video or audio data item has been viewed or listened to.

FIG. 1 is a perspective view showing an exemplary content playback apparatus according to an embodiment. As is shown in FIG. 1, the content playback apparatus 10 has a main module 11 and a display 12.

The content playback apparatus 10 receives components of a content, such as text data, still picture (image) data, moving picture data, audio (sound) data and Web content, which are included in one or more RSS feeds or blog posts that have been acquired through a network. The content playback apparatus 10 then synthesizes the components, producing, for example, a slideshow such as a moving picture based on the script describing the display timing and coordinates (display position). The apparatus 10 finally outputs the slideshow thus produced. That is, the content has a plurality of pages, each containing one or more components.

Figure 2:
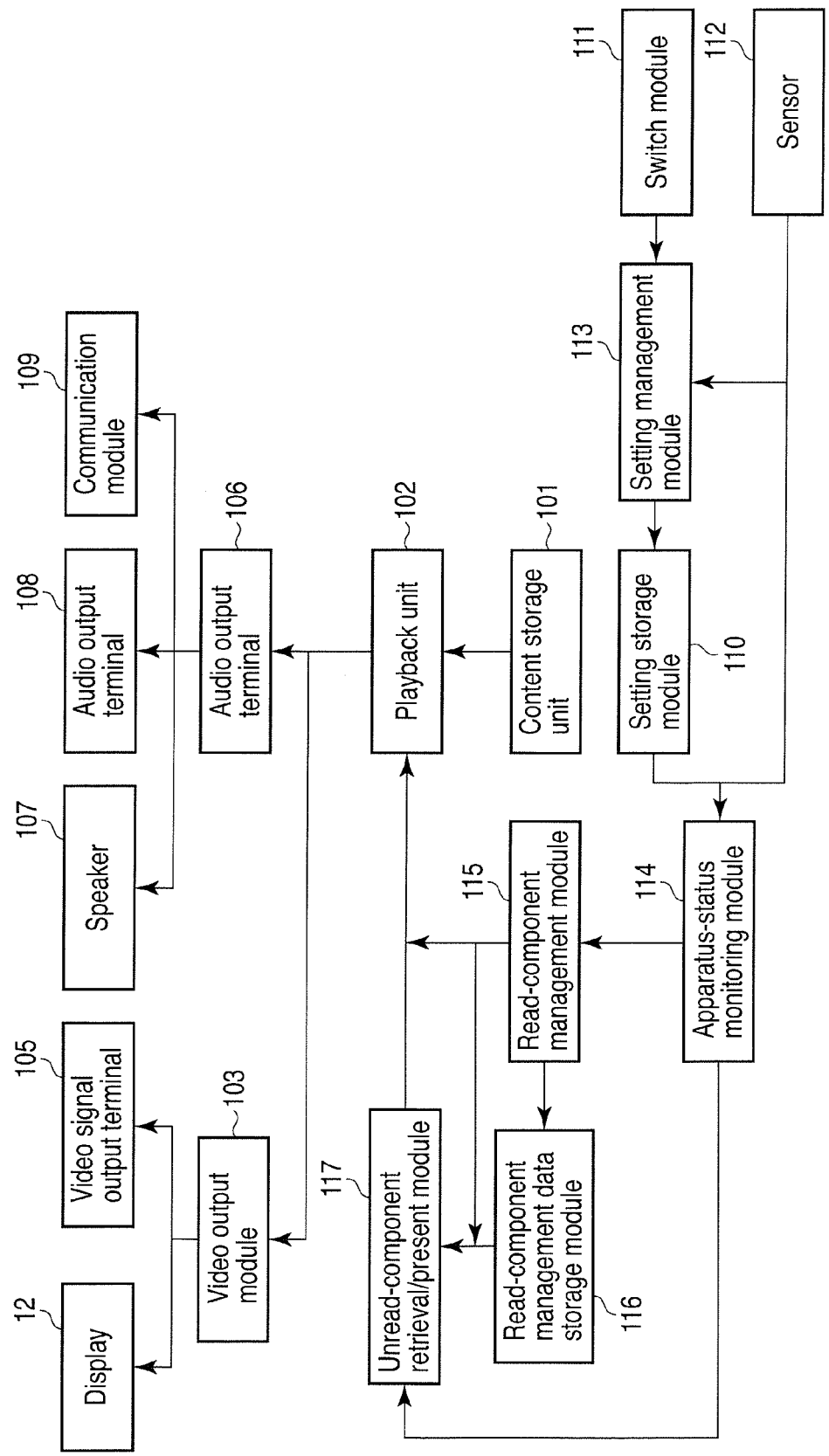
FIG. 2 is an exemplary block diagram showing an exemplary system configuration of the playback apparatus according to an embodiment.

FIG. 2 is a block diagram showing the system configuration of the content playback apparatus 10. As FIG. 2 shows, the content playback apparatus 10 comprises a content storage module 101, a playback module 102, a video output module 103, the display 12, a video signal output terminal 105, an audio output terminal 106, a speaker 107, an audio output terminal 108, a communication module 109, a setting storage module 110, a switch module 111, a sensor 112, a setting management module 113, an apparatus-status monitoring module 114, a read-component management module 115, a read-component management data storage module 116, and an unread-component retrieval/present module 117.

The content storage module 101 stores content and the components constituting the content. The playback module 102 playas back the content, in modules of pages, in accordance with the script included in the content. If a page holds a plurality of components, the playback module 102 will combine these components, playing back the page. Further, the playback module 102 gives the read-component management module 115 the information showing the components included in the page that is being played back at present.

Of the components constituting the content, the text data, still image data and moving picture data are subjected to rendering. Video data is thereby produced. The video data, thus produced, is output to the video output module 103. The video output module 103 outputs a video signal based on the video data, to the display 12. The display 12 displays the image represented by the video signal on its display screen. The video output module 103 outputs the video signal to the video signal output terminal 105, too, if an external display is connected to the video signal output terminal 105. Note that the content playback apparatus 10 may not have the video signal output terminal 105.

The audio data or audio (sound) data superimposed on the moving picture data are output to the audio output terminal 106. The audio output terminal 106 can output an audio signal or audio data, either based on the audio data, to the speaker 107, audio output terminal 108 and communication module 109. The audio output terminal 106 may output the audio signal based on the audio data, to the speaker 107 and the audio output terminal 108. If this is the case, the audio output terminal 108 outputs the audio signal to a headphone or an external speaker, and the audio output terminal 106 outputs the audio data to the communication module 109. The communication module 109 transmits a wireless signal corresponding to the audio data and based on the Bluetooth (trademark) standard.

In some cases, a speech synthesis system may produce audio data from the text-data component of the content, and the audio data thus produced may be output to the audio output terminal 106.

The setting storage module 110 stores display setting data for the display 12, output setting data for the audio output terminal 106 and recharge setting data representing whether the content playback apparatus 10 is being recharged.

The switch module 111 has various button switches for setting the content playback apparatus 10 to various operating modes. The switch module 111 has, for example, a silent-mode setting switch and a power save switch. When pushed, the silent-mode setting switch sets the content playback apparatus 10 to a silent mode. In the silent mode, the speaker 107 is muted, or made unable to produce sound at all, but the audio signal and the audio data can be output to the audio output terminal 108 and communication module 109, respectively. When pushed, the power save switch sets the content playback apparatus 10 to a power save mode. In the power save mode, the display 12 displays no images, but the speaker 107 can produce sound.

The sensor 112 is, for example, a distance senor that measures the environment of the content playback apparatus 10. The distance sensor measures the distance between the screen of the display 12 and an object existing in front of the screen. What kinds of switches and what kind of a sensor the apparatus 10 should have may depend on the type of the apparatus 10. The sensor 112 may therefore be a Global Positioning System (GPS) sensor in some cases.

The setting management module 113 manages both the display setting data for the display 12 and the output setting data for the audio output terminal 106, in accordance with which switch has been pushed at the switch module 111 and the value the sensor 112 has measured. If the silent mode, for example, is set at the switch module 111, the output setting data for the audio output terminal 106 will be set to the silent mode.

If the distance measured by the distance sensor (i.e., sensor 112) is shorter than a first preset value, indicating that the object is near the screen of the display 12, the image on the screen of the display 12 will be considered not viewable. In this case, the setting management module 113 changes the display setting data for the display 12, inhibiting the display 12 from displaying any images. The distance measured by the distance sensor may be longer than a second preset value, indicating that the object is remote from the screen of the display 12. As a result, the image on the screen of the display 12 is considered not viewable, either. In this case, too, the setting management module 113 changes the display setting data for the display 12 so that the display 12 may display no images.

The apparatus-status monitoring module 114 uses the setting data stored in the setting storage module 110, monitoring the content playback apparatus 10. To be more specific, the apparatus-status monitoring module 114 determines whether any content component is being viewed or listened to by the user.

The apparatus-status monitoring module 114, for example, makes a decision on the basis of the output setting data for the audio output terminal 106, as will be explained below.

If the speaker is not set to produce no sound, the module 114 will determine that the audio data can be supplied to the speaker.

If the speaker is set to produce no sound as in the silent mode, the module 114 will determine that the audio data cannot be supplied to the speaker.

Even if the speaker is set to produce no sound, the module 114 will determine that the audio data can be supplied to the speaker it detects that earphones, for example, are connected to the audio output terminal 108.

Even if the speaker is set to produce no sound, the module 114 will determine that the audio data can be supplied to the speaker if it detects a wireless signal, such as Bluetooth signal, corresponding to the audio signal.

Further, the apparatus-status monitoring module 114 makes a decision on the basis of the output setting data for the video output module 103, as will be described below.

If the display 12 is set to display images, the module 114 will determine that the video data can be supplied to the display 12.

If the display 12 is set not to display images automatically or manually, the module 114 will determine that the video data cannot be supplied to the display 12.

Even if the display 12 is set not to display images, the module 114 will determine that the video data can be supplied to the display 12 if it detects that the video data is output from the video signal output terminal 105.

Even if the display 12 is set to display images, the module 114 will determine that the video data cannot be supplied to the display 12 if the distance sensor detects no persons (objects) exist in front of the screen of the display 12 to view images.

The apparatus-status monitoring module 114, for example, may detect, from the recharge setting data, that that the content playback apparatus 10 is being recharged. If this is the case, the module 114 determines that the user of the content playback apparatus 10 is indoors and viewing any content component.

Moreover, the apparatus-status monitoring module 114 can use the measurement data, such as GPS data, to determine whether the user is viewing or listening to any content component. For example, the GPS position data may change with time, indicating that the content playback apparatus 10 is moving (that is, the apparatus holder is walking). In this case, the apparatus-status monitoring module 114 determines that any content component, displayed by the display 12, is not viewed at all.

The apparatus-status monitoring module 114 may determine whether any content component can be viewed or listened to, from a combination of the setting data stored in the setting storage module 110 and the distance measured by the sensor 112.

The read-component management module 115 determines whether the user has viewed or listened to any content component, on the basis of the notification coming from the playback module 102 and the decision made by the apparatus-status monitoring module 114. The decision the read-component management module 115 has made is stored, as read-component management data, in the read-component management data storage module 116. The read-component management data contains data items, each representing whether a content component has been read or not read yet.

The unread-component retrieval/present module 117 retrieves unread content components from the read-component management data stored in the read-component management data storage module 116. The unread-component retrieval/present module 117 determines whether the any unread content component retrieved can now be viewed or listened to, on the basis of the decision made by the apparatus-status monitoring module 114. The unread-component retrieval/present module 117 presents to the user only the unread component that he or she can now view and listen to. Note that the content storage module 101 and the setting storage module 110 can be arranged outside the main module 11 of the display apparatus 10, for example on the network.

Assume that the content display apparatus 10 is set to the silent mode while its holder (user) stays outdoors and the speaker 107 is therefore inhibited from producing sound. Also assume that the audio data cannot be output at all because a headset, for example, is not connected to the audio output terminal 108. Then, neither the audio data constituting the content nor the audio data contained in the file, along with the video data (e.g., moving picture), can be played back. The read-component management module 115 records, in the read-component management data, the data representing the fact that neither the audio data constituting the content nor the audio data contained in the file, along with the video data. When the user comes home, he or she may release the apparatus 10 from the silent mode, enabling the speaker 107 to produce sound. At this time, the unread-component retrieval/present module 117 gives a message of "Do you want to have the audio data played back now?"

Assume that the user is on a train so crowded that he or she cannot look at the display 12 but can listen to the audio output via the earphone he or she is wearing. In this case, the speaker 107 can produce sound, though the display 12 displays no images. This is because the distance sensor 112 detects the user is very close to the display 12 or because the power save switch has been pushed. The text data can therefore be converted to an oral message by means of speech synthesis, and the audio data contained in the file, along with the moving picture, can be output as sound. However, still images or moving pictures, if any, cannot be completely present to the user. The read-component management module 115 records, in the read-component management data, the data representing the fact that the still images or moving pictures cannot be completely present to the user. After coming home, the user may turn on the display 12. At this point, the unread-component retrieval/present module 117 gives a message of "Do you want to have the images and moving picture played back now?"

The sequence of processes the content playback apparatus 10 performs as described above will be explained with reference to the flowcharts of FIG. 3 and the flowchart of FIG. 4.

Figure 3:
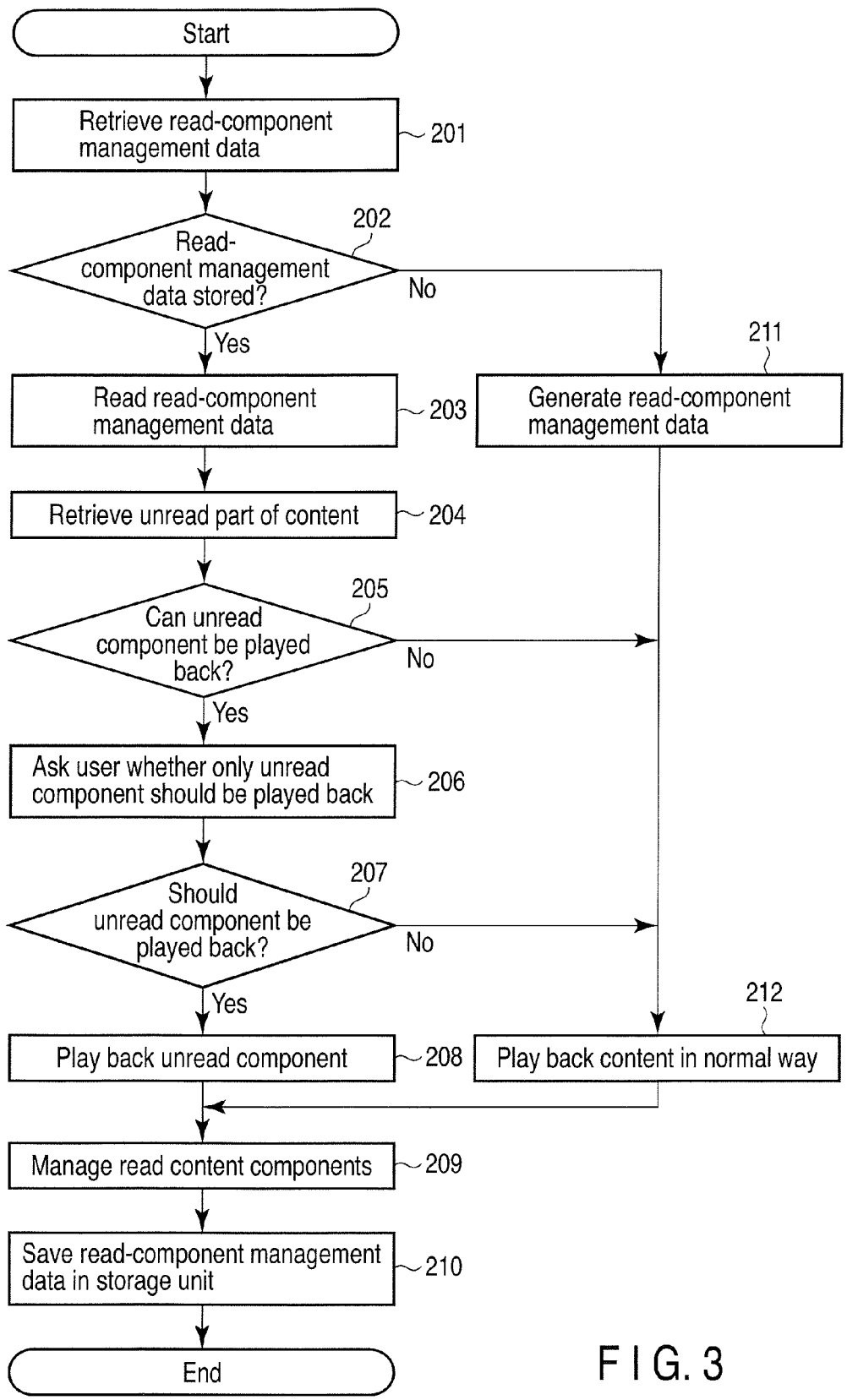
FIG. 3 is an exemplary flowchart explaining an exemplary sequence of the playback process the playback apparatus performs.
Figure 4:
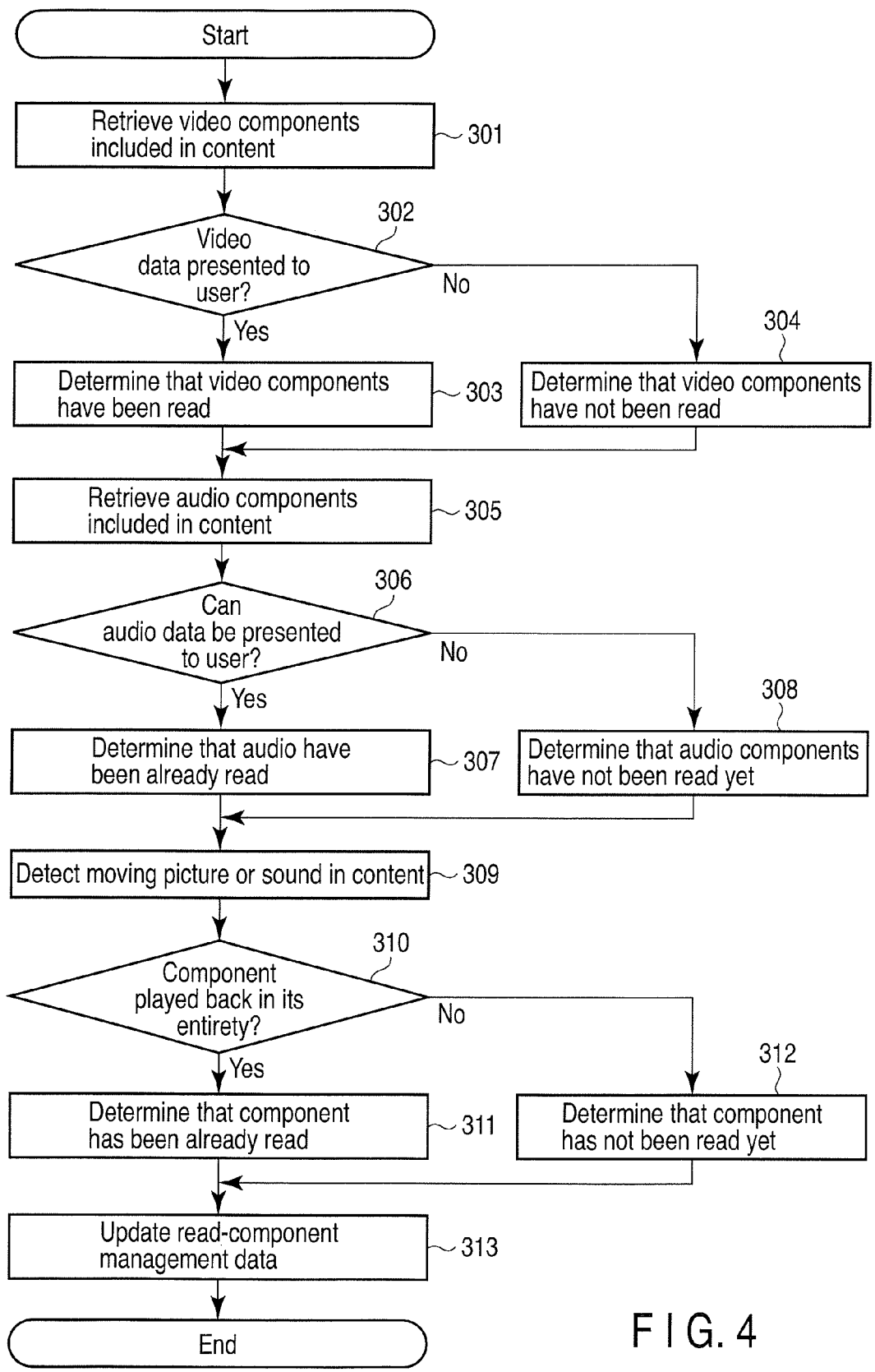
FIG. 4 is an exemplary flowchart explaining an exemplary sequence of the process the playback apparatus performs to manage components already read.

As shown in the flowchart of FIG. 3, the read-component management module 115 starts managing the read-component management data when the user instructs that the content be played back (block 201). First, the read-component management module 115 asks the read-component management data storage module 116 whether the module 116 is storing the read-component management data for the content the user has designated as one to be played back. On receiving a response from the read-component management data storage module 116, the read-component management module 115 determines whether the storage module 116 stores the read-component management data (block 202). If the read-component management data is stored in the storage module 116, it indicates that the content will be played back again. If no read-component management data stored in the storage module 116, the content will be played back for the first time.

If no read-component management data stored in the storage module 116 (No in block 202), or if the content will be played back for the first time, the read-component management module 115 produces read-component management data for the content the user has designated (block 211). Note that all items of this read-component management data have not been read. The read-component management module 115 then instructs the playback module 102 to start playing back the content from the beginning. So instructed, the playback module 102 plays back the content from the beginning (block 121). The read-component management module 115 manages the read content components, updating the read-component management data (block 209). When the content is normally played back, the read-component management module 115 saves the read-component management data in the storage module 116 (block 210). Thus, the process terminates.

If the read-component management data is found stored in the storage module 116 (Yes in block 202), or if the content will be played back for the second time, the read-component management module 115 reads the read-component management data stored in the storage module 116 (block 203). The read-component management module 115 then requests that the unread-component retrieval/present module 117 should retrieve an unread content component in accordance with the read-component management data. On receiving the request coming from the read-component management module 115, the unread-component retrieval/present module 117 retrieves the unread content component (block 204). On retrieving an unread component, the unread-component retrieval/present module 117 asks the apparatus-status monitoring module 114 for the decision the module 114 has made, determining whether the unread component can be played back or not (block 205).

From the decision the decision the module 114 has made, the unread-component retrieval/present module 117 determines whether the unread component can be played back (block 205). If the unread component cannot be played back (No in block 205), the unread-component retrieval/present module 117 instructs that the playback module 102 should perform normal playback. So instructed, the playback module 102 plays back the content from the beginner (block 212). Then, the read-component management module 115 manages the read component, updating the read-component management data (block 209). When the normal playback of the content is completed, the read-component management module 115 saves the read-component management data in the storage module 116 (block S210). Thus, the process terminates.

It may be determined that the unread component can be played back (Yes in block 205). If this is the case, the unread-component retrieval/present module 117 asks the user whether only the unread component should be played back (block 206). The unread-component retrieval/present module 117 may cause the display 12 to display, for example, a dialog informing the user there is the unread component, and display a button in the dialog. The user may touch the button to make the apparatus 10 play back the unread component.

Then, it is determined whether the unread component should be played back (block 207). If the user responds that only the unread component should not be played back (No in block 207), the unread-component retrieval/present module 117 instructs the playback module 102 to play back the content from the beginning. So instructed, the playback module 102 plays back the content from the beginner (block 212). Then, the read-component management module 115 manages the read component, updating the read-component management data (block 209). When the normal playback of the content is completed, the read-component management module 115 saves the read-component management data in the storage module 116 (block S210). Thus, the process terminates.

If the user responds, requesting that only the unread component should be played back (Yes in block 207), the unread-component retrieval/present module 117 instructs the playback module 102 to play back only the unread component that can now be viewed or listened to (block 208). In this case, the read-component management module 115 manages the read component, changing the read component in the page output from the playback module 102 (block 209).

When the unread component is completely played back, the read-component management module 115 saves the read-component management data in the storage module 116 (block S210). Thus, the process terminates.

If a plurality of unread components should be played back in block 208, the order in which they should be played back will be important. This order is described, as priority order, in the script. The system of FIG. 2 holds some priority orders, one of which the user may select. The priority orders are as follows, for example.

The latest unread component is played back first, and the earliest unread component is played back last.

The unread components are played back in random order.

The unread component considered most important is played back first, and the unread component considered least important is played back last.

The user may not want to review a component even if the component is recorded as "unread" in the read-component management data. In view of this, the importance of each component may be set in the script, and both the read components and unread components are controlled in accordance their importance. For example, an advertisement component is labeled as "not notified to the user even if it has not been read yet." Conversely, any component that the user should not miss to understand the context (story) of the content is labeled as "if not read, the playback will be stopped right away."

If any unread component is played back, the page containing the component may be played back, too.

Any unread component can be notified not only on the screen of the display 12, but also to any other terminal or a Web terminal by using mail protocol or message protocol.

Now, the sequence in which the read-component management module 115 manages read components in block 209 will be explained in detail, with reference to the flowcharts of FIG. 4. The read-component management module 115 manages the unread components in each page the playback module 102 plays back.

In order to produce read-component management data, the read-component management module 115 classifies the components included in the page being played back, into "video components" the display 12 will display and "audio components" the speaker 107 or audio output terminal 108 will output. This classification is based on the assumption that the content playback apparatus 10 is an existing smartphone or mobile device. If or when new types of devices capable of presenting data to users become available, the components will be classified accordingly. In the blocks shown in FIG. 4 do not depend, one on another, in the order they are performed. That is, the blocks may be performed in reverse order to that specified in FIG. 4.

In the process of producing the read-component management data, the read-component management module 115 retrieves video components included in the content page being played back (block 301). Next, the read-component management module 115 then asks the apparatus-status monitoring module 114 whether the video components assume such a state as can be presented to the user. At this point, the apparatus-status monitoring module 114 determines whether the video data corresponding to the video components can be presented to the user, on the basis of the setting data stored in the setting storage module 110 and the data acquired by the sensor 112 (block 302).

The video data may be found able to be presented to the user (Yes in block 301). Then, the read-component management module 115 determines that the video components included in the content page being played back have been already read (block 303). If the video data is not found able to be presented to the user (No in block 301), the module 115 determines that the video components included in the content page being played back have not been read yet (block 304).

Next, the read-component management module 115 retrieves audio components included in the content page being played back (block 305). The module 115 then asks the apparatus-status monitoring module 114 whether the audio components assume such a state as can be presented to the user. At this point, the apparatus-status monitoring module 114 determines whether the audio data corresponding to the audio components can be presented to the user, on the basis of the setting data stored in the setting storage module 110 and the data acquired by the sensor 112 (block 306).

If the audio data is found able to be presented to the user (Yes in block 306), the read-component management module 115 determines that the audio components being played back have been already read (block 307). If the audio data is not found able to be presented to the user (No in block 306), the module 115 determines that the audio components being played back have not been read yet (block 308).

The read-component management module 115 then detects the state in which the component (i.e., moving picture or sound) attracting the user for some time is played back (block 309). The module 115 then determines, from the state detected, whether the component attracting the user has been played back in its entirety (block 310). If this component has been played back in its entirety (Yes in block 310), the read-component management module 115 determines that the component has been already read (block 311). If the component has not been played back in its entirety (No in block 310), the module 115 determines that the component has not been played back for some reason, and therefore determines that the component has not been read yet (block 312). It may be detected that the playback of a moving picture has been started, but stopped in a few seconds. In this case, it is determined that the user has no interest in the moving picture, and that the moving picture has been read, though not completely played back.

Upon completion of these processes, the read-component management module 115 updates the read-component management data, on the basis of the decision made in block 311 or block 312 (block 313).

The content playback apparatus 10 can play back content in various environments, but the user may not listen to an audio component included in the content or may not view a video component depending included in the content, depending upon the environment in he or she is using the content playback apparatus 10. Nonetheless, the content playback apparatus 10 can determine, from the state it assumes, whether the user can view or listen to any content component, and can then manage the read/unread state of each content component in accordance with the decision it has made.

The content playback apparatus 10 described above may be used as an electronic book terminal configured to display not only book pages, but also moving pictures. Electronic books may contain moving picture data. Moving pictures greatly differ in concept from book pages, which can be read anytime at any speed the user wants. The user may be reading, on a train, an electronic book containing a four-minute moving picture, may need to get off the train in two minutes. In this case, the apparatus 10 can ask the user, "Do you want to have the remaining part of the moving picture (with sound) played back?" only if the apparatus 10 has recorded the time for which the moving picture has been played back on the train.

Unlike any printed book, the electronic book can contain not only the text and illustrations, but also audio data and a moving picture. The user can therefore enjoy reading the text and viewing the illustrations on the train in which the audio data cannot be played back, and may enjoy viewing the remaining part of the moving picture (with sound). Similarly, the user may enjoy, in a car, listening to the synthesized voice reciting the text, and then enjoy, at home, viewing the illustrations and moving picture.

The content playback apparatus 10 may transmit the read-component management data to a sever provided on a network. Then, the content playback apparatus 10 can present any unread content component on the basis of the read-component management data now stored in the server. Moreover, any other content playback apparatus may also transmit read-component management data to the sever. The content playback apparatus 10 can then present any unread content component even if the other content playback apparatus is playing back the content. In this case, the other content playback apparatus does not need to have the unread-component retrieval/present module 117.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A content playback apparatus comprising:
a playback module configured to play back a content comprising components selected from moving picture data, image data, sound data and text data, thereby to produce video data and audio data, wherein the playback module is configured to play back the components based on a script which describes timing of playing back the components;
a decision module configured to determine, based on a state of the content playback apparatus, whether the components of the content can be viewed and listened to, wherein the decision module is configured to determine whether a component of the content has been viewed or listened to, while the component is being played back based on the script; and
a management module configured to manage video-audio management data comprising data items corresponding to the components and based on a decision result of the decision module, each data item representing whether a corresponding one of the components has been viewed or listened to.

2. The apparatus of claim 1, further comprising:
an audio output module configured to output an audio signal based on the audio data; and
a video output module configured to output a video signal based on the video data,
wherein the decision module is configured to determine whether the components of the content are able to be viewed and listened to, based on audio output setting of the audio output module and video output setting of the video output module.

3. The apparatus of claim 2, wherein the decision module is configured to classify the components of the content into video components and audio components, to determine whether the video components have been viewed based on the video output setting, and to determine whether the audio components have been listened to based on the audio output setting.

4. The apparatus of claim 2, further comprising a measuring module configured to measure an environment of the content playback apparatus,
wherein the decision module is configured to determine whether the components of the content have been viewed and listened to, based on the audio output setting, the video output setting, and a result of measurement of the measuring module.

5. The apparatus of claim 2, further comprising:
a measuring module configured to measure an environment of the content playback apparatus;
a switch; and
a setting managing module configured to manage the audio output setting or the video output setting based on a state of the switch or a result of measurement of the measuring module.

6. The apparatus of claim 1, further comprising a controller configured to ask a question of whether a component of the content is played back, when the video-audio management data comprises a data item showing the component not viewed or listened to at the time of playing back the content and the decision module determines that the component corresponding to the data item is able to be viewed or listened to, and to control the playback of the content in response to an answer to the question.

7. A content playback method comprising:
playing back a content comprising components selected from moving picture data, image data, sound data and text data, thereby to produce video data and audio data, wherein the components are played back based on a script which describes timing of playing back the components;
determining whether the components of the content can be viewed and listened to, based on audio output setting of audio output module configured to output an audio signal based on the audio data, and video output setting of video output module configured to output a video signal based on the video data, wherein the determining comprises determining whether a component of the content has been viewed or listened to, while the component is being played back based on the script; and
managing video-audio management data comprising data items corresponding to the components and based on a result of the determining, each data item representing whether a corresponding one of the components has been viewed or listened to.

8. The method of claim 7, further comprising:
outputting, by an audio output module, an audio signal based on the audio data; and
outputting, by a video output module, a video signal based on the video data,
wherein the determining comprises determining whether the components of the content are able to be viewed and listened to, based on audio output setting of the audio output module and video output setting of the video output module.

9. The method of claim 8, wherein the determining comprises:
classifying the components of the content into video components and audio components;
determining whether the video components have been viewed based on the video output setting; and
determining whether the audio components have been listened to based on the audio output setting.

10. The method of claim 8, further comprising measuring an environment of the content playback apparatus,
wherein the determining comprises determining whether the components of the content have been viewed and listened to, based on the audio output setting, the video output setting, and a result of measurement of the measuring module.

11. The method of claim 8, further comprising:
measuring an environment of the content playback apparatus; and
managing the audio output setting or the video output setting based on a state of a switch or a result of the measuring.

* * * * *